C. M. ARTHUR.

3 Sheets—Sheet 1.

PAPER BOX.

No. 10,614.

Reissued June 16, 1885.

Witnesses:-
Louis M. Whitehead.
C. C. Poole

Inventor:-
Charles W. Arthur.
by:- M. E. Dawson
Attorney

C. M. ARTHUR.

3 Sheets—Sheet 2.

PAPER BOX.

No. 10,614.

Reissued June 16, 1885.

Witnesses:-
Louis W. Whitehead.
C. C. Poole

Inventor:-
Charles W. Arthur.

by:-
M. E. Dawson

Attorney:-

C. M. ARTHUR.

PAPER BOX.

No. 10,614. Reissued June 16, 1885.

Witnesses:-
Louis M. Whitehead.
C. C. Poole

Inventor:-
Charles W. Arthur.
by:-
W. E. Dayton
Attorney:-

UNITED STATES PATENT OFFICE.

CHARLES M. ARTHUR, OF EVANSVILLE, WISCONSIN.

PAPER BOX.

SPECIFICATION forming part of Reissued Letters Patent No. 10,614, dated June 16, 1885.

Original No. 310,241, dated January 6, 1885. Application for reissue filed May 11, 1885.

*To all whom it may concern:*

Be it known that I, CHARLES M. ARTHUR, of Evansville, in the county of Rock and State of Wisconsin, have invented certain new and useful Improvements in Paper Boxes; and I do hereby declare that the following is a full, clear, and exact description thereof, reference being had to the accompanying drawings, and to the letters of reference marked thereon, which form part of this specification.

This invention relates to the class of collapsible or knockdown paper boxes; and it consists in the matters hereinafter fully set forth, and pointed out in the appended claims.

The several branches of the invention concern the form of the blank, the form of the fold, and the attachments of the collapsed and partly-joined box, and the completed structure.

The invention is herein illustrated in connection with a "telescoping box;" but it may be applied equally well to the construction of open-topped boxes, such as are supplied with separate covers, or to boxes of other kinds.

Figure 1:
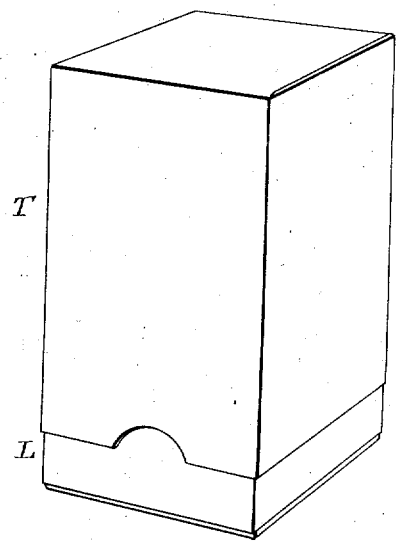
Figure 2:
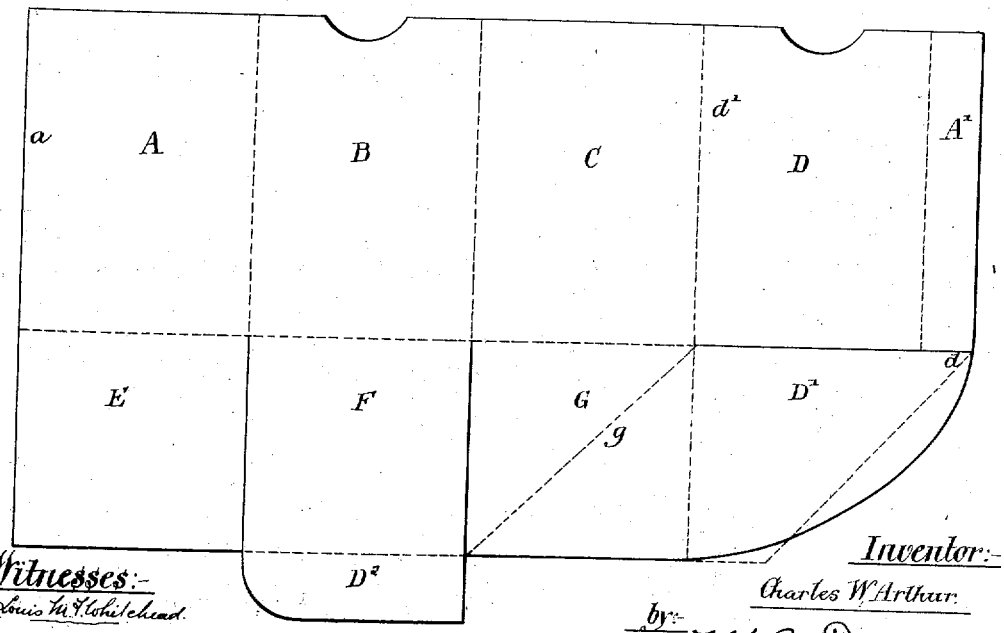
Figure 7:
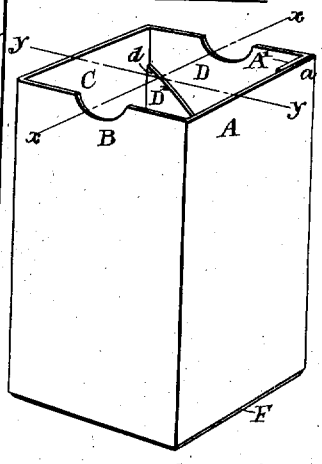
Figure 8:
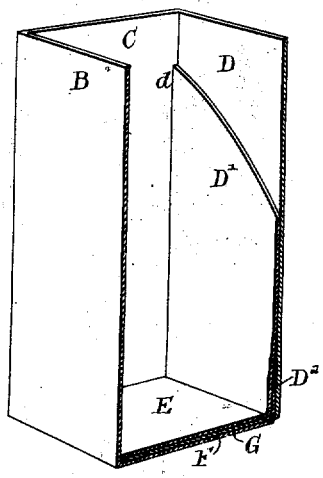
Figure 9:
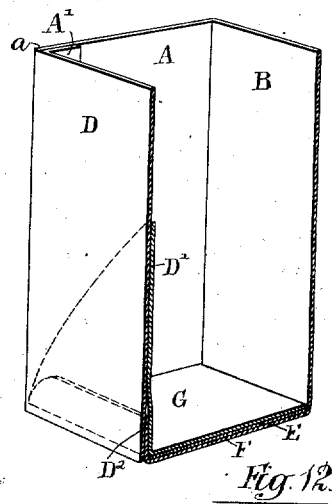
Figure 10:
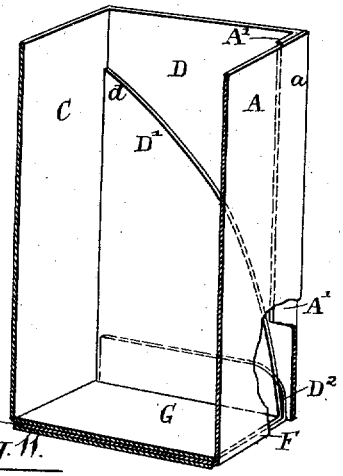
Figure 12:
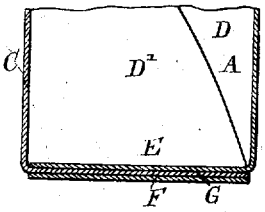
Figure 11:
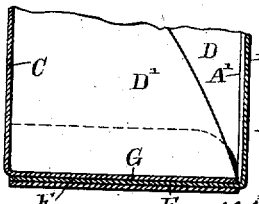

In the accompanying drawings, Figure 1 is a perspective view of a telescoping form of paper box embodying my improvement. Fig. 2 shows an extended blank from which an open-ended paper box adapted to form one-half of a telescoping box may be formed in accordance with my present improvement. Figs. 3, 4, 5, and 6 illustrate the blank variously folded, showing different stages in the folding of the blank, and in some particulars also showing dissimilar forms of folds made therein in completing the collapsed and pasted structure from the blank. Fig. 7 is a perspective view of an open-ended box, which may form either the outer or the inner of two parts of a telescoping box such as is shown in Fig. 1, but which contains a certain peculiarity of construction that particularly fits it to form the outer one of said parts. Fig. 8 is a perspective interior view of one-half of the open box shown in Fig. 7, divided in the plane of the line *x x*, and looking toward the side C. Fig. 9 is an interior perspective view of the opposite half of the said box, or looking toward the side A. Fig. 10 is a perspective interior view of one-half of the box shown in Fig. 7, vertically divided in the plane of *y y*, and looking toward the side D. Fig. 11 is an interior view of the opposite half of the box, or looking toward the side B. Fig. 12 is a view of the same part of the box as shown in Fig. 11 when the several parts of the box-bottom occupy the relation given them in that form of fold in the blank shown in Fig. 6.

One of the objects of this invention is to provide a form of blank for a collapsed or collapsible paper box in which two parts which, either in the collapsed or in the finished box, are to be located at a distance from each other are brought into line with and adjacent to each other, so that the paste, glue, or other adhesive agent may be conveniently and rapidly applied to said part, and in which, when the members of the blank are folded upon each other to form the collapsed box, both pasted surfaces are brought into proper position for attachment with the members with which they are to be joined.

Another object of the invention is to provide a construction in a collapsed box in which not only the lap which joins the sides is pasted or secured, but in which the interior lap, which connects one of the bottom flaps to the appropriate side of the box, is also permanently secured, so that it fully sustains said bottom piece, and also brings the latter perfectly and promptly to its place in the operation of finally setting up the box.

Still another object of the invention is to provide a form of the interiorly-projecting lapping partial side of the outer part of a telescoping box whereby said lapping and projecting member will offer little obstruction to the application of the parts of the telescoping box to each other.

In Fig. 2, which shows the blank extended, full lines indicate through cuts at which the adjacent parts are entirely separated, and dotted lines indicate scores to facilitate folding, except the dotted lines at the margin of the member D′, which indicate one allowable variation in the form of said member.

A, B, C, and D in the blanks shown are the four sides of the box, and A′ is a lap-piece, said parts or members of the blank being continuous and in line with each other, and separated only by the scores indicated.

E, F, and G are adjacent continuations of the several members A, B, and C, respectively, intended to form the closed end of the box when the latter is set up, and called "end pieces"

or "end flaps." The central end piece or flap, F, is provided with an extension, $D^2$, intended to form a tuck to hold the said flap in place in the completed box in a familiar manner. Through cuts in the blank completely separate said end flaps E, F, and G, from each other, and all these parts or members are separated from the side members by scores, and a score also marks the division of the tuck-flap $D^2$ from the end piece F.

D′ is a lateral continuation of flap G, extending toward the free edge of the lap-piece A′, and commonly narrowed to a point at its outer end, as shown. Said part D′ is intended to fold upon the inner side member D, with its point or end *d* at *d′*, Figs. 2 and 3, and to be permanently secured at this point or end to said side by paste or glue. The said end piece G has a score-line, *g*, which bisects the angle adjacent to the side D, to permit the said end piece to be temporarily folded upon itself for the purpose of forming the collapsed and partially-joined structure. This particular score-line forms a single feature in a former invention set forth in Letters Patent of the United States No. 234,221, dated November 9, 1880, and is not here independently claimed. It is of course understood that the lap A′ is to be united by paste or glue to the inner face of the side A at its edge *a*. It is desirable, in order to readily and economically accomplish the pasting necessary to join the lap-piece A′ with the side A and the extremity of the member D′ with the side D, as described, that the said extremity of the member D′ and the lap-piece A′ be arranged adjacent to each other, as shown.

In the following description it may be understood that the paste has been applied to the under surface of these parts A′ and D′ by some suitable device or means while the blank is in its extended form, as shown in Fig. 2. After being pasted, the members of the blank are folded in their score-lines, substantially as will be next described.

Figure 5:
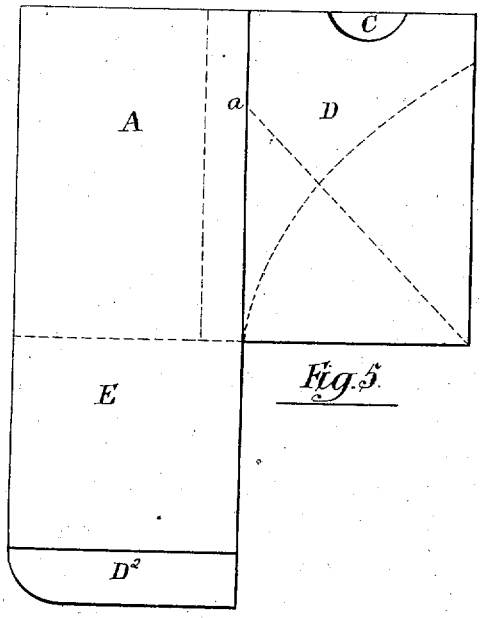

With a view to imparting greater supporting strength to the closed end of the completed box, I prefer to turn the flap G toward the side C, and to simultaneously fold said flap G upon itself by bending it in the score-line *g*. This operation brings the several members G and D′ into the positions indicated in Fig. 3, with the pasted surface on the part D′ uppermost. Next, the side D may be folded over the parts C, D′, and G, bringing the pasted surface of the lap-piece A′ uppermost, in the position indicated in Fig. 4, and also bringing the inner surface at *d′* of the side D into contact with the pasted surface *d* of the part D′. The side A is then folded upon the side B and pasted lap A′, as indicated in Fig. 5, a permanent union of the side with the lap being effected by the application of suitable pressure of the hand or otherwise. The blank being thus folded and joined in two places presents the collapsed structure shown in plan in Fig. 5. Said structure is obviously capable of being expanded and further folded to form an open-ended box at any time by first pressing the extreme lateral edges thereof until the sides are at right angles with each other, and then turning in the flap E over the thus extended end piece G, and finally folding the outer flap, F, over E and thrusting its tuck $D^2$ into the space between the members D and D′. The arrangement of the end pieces just described is shown in Figs. 8, 9, 10, and 11.

Still greater strength may be obtained in the closed end by proceeding as follows from the stage of the folding represented in Fig. 3— that is to say, first turn the flap E against the side A, and then simultaneously turn the sides A and D toward each other, inserting the lap A′ between A and E as both are borne down upon the underlying sides B and C. Thereafter the flap F $D^2$ may be folded over into the position shown in Fig. 6, if desired, giving to the collapsed structure the compact rectangular form presented by said Fig. 6. In finally setting up the box, having the end piece E upturned, as last described, the bottom piece, G, (as before,) straightens out of itself when the sides are brought to rigid angles with each other, and the flap E will need to be pushed down upon it by the finger from the inside of the box, after which the flap F and tuck $D^2$ are disposed of, as before set forth. The arrangement of the bottom pieces will in this case have the relations shown in Fig. 12.

Figure 3:
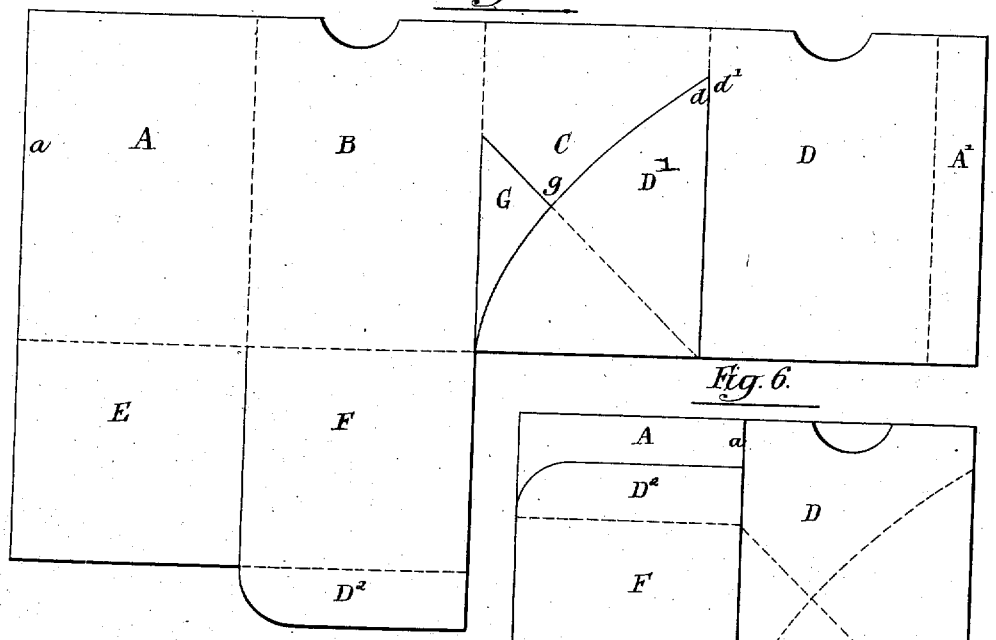
Figure 6:
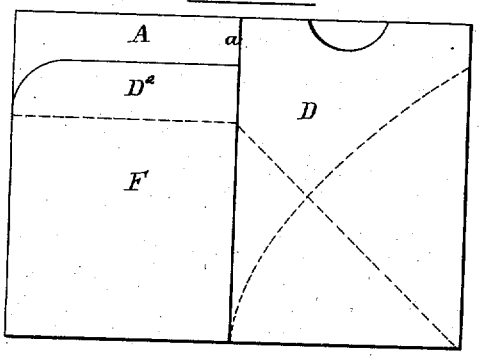
Figure 4:
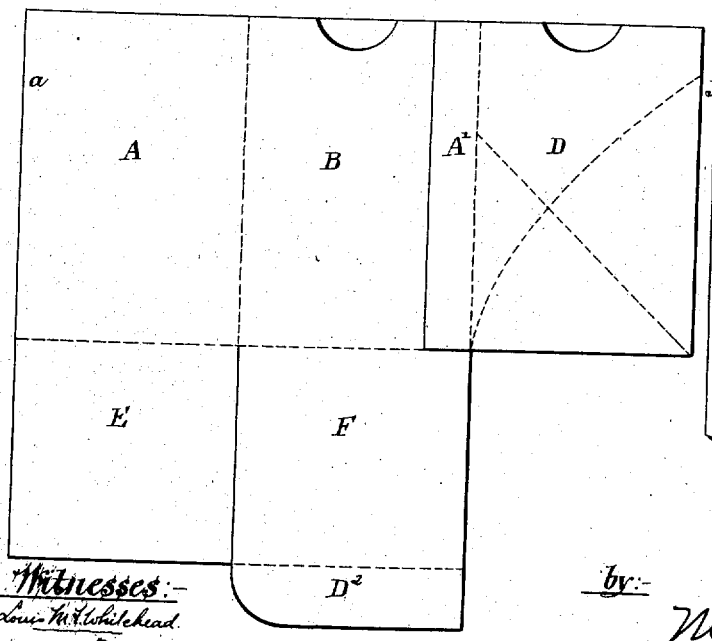

In bringing the member D′ upon C, instead of folding the end piece G upon the side member C, as above suggested, and as shown in Fig. 3, said end piece may be simply folded upon itself in the diagonal score *g*; but in this case the form of collapsed box shown in Fig. 6 is not obtainable.

In the use of an open-ended box formed as and from the blank described for the larger or outer part of a telescope box such as is illustrated in Fig. 1, the inclined direction of the projecting edge of the member D′ favors its passage over the upper edge of the inner half-box, and thus facilitates putting the two telescoping parts together.

In the blank illustrated in the accompanying drawings the flap D′ is extended at its free end to a point in line with the free edge of the flap A′; but it will of course be understood that the length of said flap will be made to correspond with the height or depth of the box, so that when the side walls of the latter are lower than the combined width of the parts D and A′ the said flap will be cut off at its outer end in order to prevent the end of the flap from projecting above the upper edge of the box when the box is folded.

It is entirely obvious that as far as the operation of the flap D′ is concerned in holding the parts of the box in place the said flap may be of other shape than as herein shown, and my invention is not, therefore, limited to the particular form of the flap shown, except in the particular claim in which that feature is specified.

I claim as my invention—

1. A box-blank comprising the four sides A B C D and lap A′, arranged continuously in line with each other, the end flaps E, F, and G, continuous with the sides A, B, and C, the tuck $D^2$, continuous with the flap F, and a member, D′, continuous with the side of the flap G and extending toward the free edge of the lap-piece A′, substantially as described, and for the purposes set forth.

2. A collapsed partly-made box constructed from the parts described, and having the parts A′ and D′ permanently secured, respectively, to the sides A and D, as set forth.

3. A box constructed from the blank composed of the members described, and having the member D′ permanently secured to the side D, substantially as and for the purposes set forth.

4. In a telescoping box, the combination, with an inner part, L, of the box, of an outer open-ended part, I, constructed from the blank described, and having the member D′ pointed and permanently secured at its pointed extremity to the side D, substantially as and for the purposes set forth.

In testimony that I claim the foregoing as my invention I affix my signature in presence of two witnesses.

CHARLES M. ARTHUR.

Witnesses:
JOSIAH WADSWORTH,
MILES HARRIS.